United States Patent
Brodie et al.

[11] 3,782,194
[45] Jan. 1, 1974

[54] ADJUSTABLE TEMPERATURE INDICATORS

[76] Inventors: Donald E. Brodie, 706 Briarwood Ct.; Mathew Camarota, 904 Gainsway Rd., both of Yardley; Charles R. Jankowski, 109 Lions Dr., Morrisville, all of Pa. 19067

[22] Filed: Sept. 30, 1971

[21] Appl. No.: 185,317

[52] U.S. Cl. ............... 73/343 R, 73/356, 73/358, 116/114.5
[51] Int. Cl. ................................. G01k 11/08
[58] Field of Search ............... 73/343 R, 358, 356; 116/114.5; 99/138 R, 138 S

[56] References Cited
UNITED STATES PATENTS
3,430,491 3/1969 Gignilliat .................... 73/358
2,844,031 7/1958 Rosenthal .................. 73/343 R FOREIGN PATENTS OR APPLICATIONS
227,569 1/1925 Great Britain ............. 73/343 R OTHER PUBLICATIONS
Donald Duck by Walt Disney from Washington Post June 13, 1951 page 14 B.
Skuse's Complete Confectioner, 1957, pages 45 and 46.

Primary Examiner—Richard C. Queisser
Assistant Examiner—Denis E. Corr
Attorney—Ostrolenk, Faber, Gerb & Soffen

[57] ABSTRACT

An adjustable temperature indicator which, in one preferred embodiment, may take the form of a confectionary lollipop candy having a stem imbedded into the head of the lollipop. A cavity is provided within the lollipop head which houses a temperature sensitive indicator, preferably of a distinctive shape, which is adapted to melt at a predetermined temperature level. Since the temperature sensitive element is completely non-toxic, the confectionary head (including the temperature sensitive element) may be completely ingested without danger of harming the user. Similar structures may be provided in the form of confectionary straws or pacifiers. Confectionary members may be provided with a plurality of temperature sensitive devices, each sensitive to a differing temperature level.

17 Claims, 7 Drawing Figures

PATENTED JAN 1 1974
3,782,194
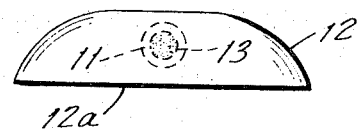
FIG. 1c
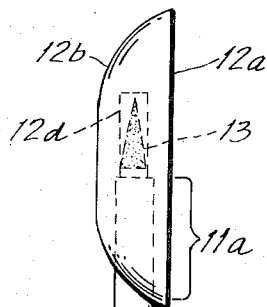
FIG. 1b
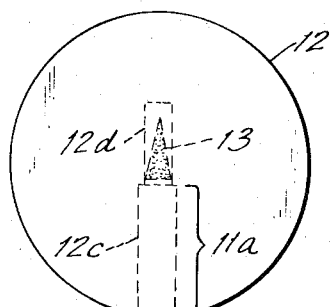
FIG. 1a
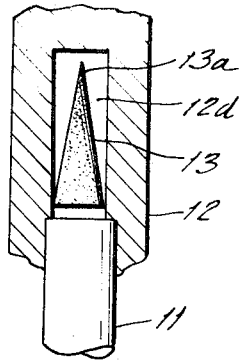
FIG. 1d
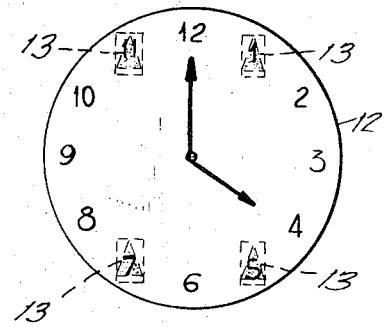
FIG. 1e
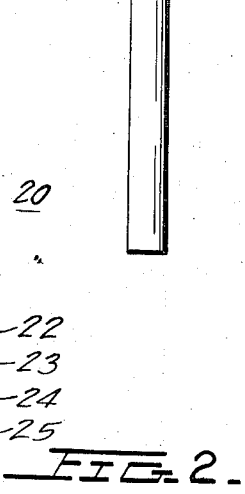
FIG. 2
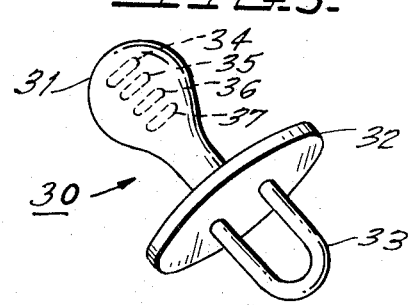
FIG. 3
INVENTORS
DONALD E. BRODIE
BY MATTHEW CAMAROTA
CHARLES R. JANKOWSKI
Ostrolenk, Faber, Gerb & Soffen
ATTORNEYS

ADJUSTABLE TEMPERATURE INDICATORS

The present invention relates to temperature sensitive devices and more particularly to temperature sensitive devices housed within confectionary members which are completely non-toxic members and wherein the temperature sensitive elements change shape at predetermined temperature levels.

BACKGROUND OF THE INVENTION

An important problem facing both parents and physicians is the ability to determine whether a sick child has a fever. Standard technique consists of the use of an oral-rectal, mercury-filled glass thermometer which typically is appropriately placed beneath the tongue of the patient. It is well known that numerous difficulties are presented to both parent and child for this otherwise simple diagnostic procedure. Among these are the problems of properly positioning the thermometer, improper shaking down of the mercury before insertion, and the fragility of the glass thermometer — the last problem being capable of presenting serious potential hazards to the patient. The danger of breakage is ever present. The resultant ingestion of glass and/or of highly poisonous mercury into the body may also cause further sickness. Improper use of such thermometers thereby involves dangers that may cause potentially permanent injury to the patient. Because of the hazards and the potential threat to health, medical science is constantly seeking new paths in diagnostic health safety especially where the well being of the patient is concerned.

Various attempts at producing a safe and effective temperature sensing device have been proposed and developed and actually marketed. The shortcomings of these methods or techniques have become evident when one considers the continuing widespread use of the glass mercury thermometer by both physicians and the public. An analysis of these temperature taking techniques clearly points up their shortcomings and disadvantages, among which are: the complex nature of the technique; the difficulties of reading and interpretation; the hazards of application, the unpleasantness, pain or discomfort associated with their use; and their expense to both the general public and the medical profession.

A BRIEF DESCRIPTION OF THE INVENTION

The present inventors have banded into a research group which has been keenly interested in this overall problem. One member of this group and a co-inventor of the subject invention is a practicing physician who encounters this problem in his daily routine. Frequent discussions and meetings among the members of the group led to the systematic development of a method for taking temperature which is simple, inexpensive, pleasant and most important non-hazardous to the patient without sacrificing accuracy. The device developed and its technique for use is so harmless that there is no possibility of accidental injury or poisoning of any nature or degree and, in fact the patient may actually ingest the device without any danger of being poisoned or becoming ill.

The efforts of the group have resulted in the development of a truly pleasant, effective, accurate and harmless temperature sensitive device which has been designed and constructed to fit the needs of the sick child's world. The results of this effort have culminated in the development of a temperature sensing lollipop.

The temperature sensing device is comprised of a confectionary sugar lollipop candy having a stiff paper or cardboard rope or wooden stem imbedded into the confectionary head of the lillipop which head is further provided with a cavity for receiving and containing a temperature sensing indicator which changes form and is thereby easily perceived in its altered form so as to provide an indication of the presence of fever after being held in the mouth for a short length of time.

The confectionary head is specifically designed to fit, anatomically, the shape of the palate or roof of the mouth comfortably. The confectionary base, in one preferred form, is pleasant, easily soluble, and further provides a lubricating vehicle for the mouth during fever. Once the indicator changes its form, the lollipop may either be completely ingested or disposed of. Our lollipops are easily storable to the same extent as any conventional quality lollipop and has a long shelf life. The indicator, being sealed into the body of the confectionary head, is also adapted to be maintained stable over a considerable time.

The confectionary head can be made from a variety of sugars but in one preferred embodiment is has taken the form of a smooth colorless sweet confectionary head having excellent transparency, solubility and temperature range stability.

The temperature sensing head is formed of a material which is caused to melt upon receiving a predetermined temperature level. This material is preferably molded or otherwise formed into a well defined shape, and may alternatively be admixed with a non-toxic colored dye to greatly enhance the contrast between the temperature sensing element and the confectionary head in which it is encased. A change in the shape of the temperature sensing element as a result of the achievement of the predetermined temperature level is easily discernible, thereby providing a device which is easy to read.

Plural temperature sensing devices may be imbedded within the confectionary head to provide indication of different levels of temperature.

The confectionary element may also assume different shapes. For example, the confectionary head may be molded so as to form the nipple of an infant's pacifier which encases one or more temperature sensing elements. Alternatively, the confectionary member may assume the shape of a candy straw having one or more temperature sensing elements imbedded therein.

It is therefore one object of the present invention to provide an ingestible non-toxic temperature sensing device.

Another object of the present invention is to provide a novel ingestible temperature sensing device in the form of a lollipop having a confectionary head in which is imbedded a temperature sensing element whose shape changes when placed within an environment which reaches or surpasses a predetermined temperature level.

Still another object of the present invention is to provide a novel ingestible temperature sensing device comprising a confectionary member having a plurality of temperature sensing elements of predetermined shape imbedded therein which are adapted to alter their original shape upon the achievement of differing predetermined temperature levels.

BRIEF DESCRIPTION OF THE FIGURES

The above as well as other objects of the invention will become apparent when reading the accompanying description and drawings in which:

FIGS. 1a-1c are front, side and top views, respectively of a temperature sensor embodying the principles of the present invention.

FIG. 1d is an enlarged sectionalized view of the embodiment of FIGS. 1a-1c showing the temperature sensitive element in greater detail.

FIG. 1e is a front view showing an alternative embodiment for the structure of FIGS. 1a-1d.

FIG. 2 shows an elevational view of another alternative embodiment of the present invention.

FIG. 3 is a perspective view of still another alternative embodiment of the present invention.

DETAILED DESCRIPTION OF THE FIGURES

FIGS. 1a-1d show one embodiment 10 of the present invention which is comprised of an elongated rod-shaped stem 11 which may, for example, be formed of wood, stiff paper, cardboard or other like materials. The embodiment 10, commonly referred to as a lollipop, is further comprised of a confectionary head 12 having a substantially circular shaped periphery as can best be seen in FIG. 1a. One side 12a of the confectionary head is preferably made flat while the remaining surface 12b is provided with a curvature which anatomically is adapted to fit the roof of the mouth of a patient.

The confectionary head is provided with a hollow substantially cylindrical shaped opening 12c in which a top portion 11a of the stem 11 is imbedded.

The confectionary head is further provided with a substantially cylindrical shaped opening 12d of slightly smaller diameter than the opening 12c which opening is positioned immediately above opening 12c.

Opening 12d houses a temperature sensitive element 13 having a conical configuration and whose composition is R-Eicosane which has been impregnated with a non-toxic red dye. The material employed is a hydrocarbon wax preferably constructed so as to assume the shape shown in the figures so that the sharp pointed tip 13a will melt at temperatures in the range from 101°-105°F. when held in the mouth for two to three minutes. If, after this, the pop is removed from the mouth and the pointed shape is retained, then no fever is present.

The indicator employed in the lollipop structure 10 is a straight chain series of hydrocarbon (Alkanes) wazes. One of the elements employed, Eicosane, has a melting point of 101°F. which is the ideal medium to show the presence of fever. All the members of this Alkanes series are non-toxic and, by using various combinations of Alkanes, it is possible to prepare in-dicators having melting points from 101°F to 105°F. The materials found most suitable are straight chain aliphatic hydrocarbon waxes (preferably alkanes) having 19–22 carbon atoms. Compounds which were found to yield the desired results within this category were:

Nonadecane $CH_3 (CH_2)_{17} CH_3$
Eicosane $CH_3 (CH_2)_{18} CH_3$
Heneicosane $CH_3 (CH_2)_{19} CH_3$
Docosane $CH_3 (CH_2)_{20} CH_3$ Since the hydrocarbon waxes described hereandabove are practically colorless, we have mixed them with small amounts of a non-toxic colored dye which does not appreciably alter the melting point but forms a solid color which contrasts extremely well with the confectionary head. Suitable dyes which may be employed are those non-toxic wax-miscible dyes which are on FOA approved list.

The confectionary head may be made from a variety of sugars. We have chosen what is commonly referred to as barley sugar which produces a smooth, colorless, and sweet lollipop head with excellent transparency, solibility and temperature range stability. Obviously any confectionary material may be employed which provides the above characteristics and which is adapted to permit substantially unimpeded observation of the temperature sensing element. If desired, only the immediate region of the faces 12a and 12b covering the temperature sensitive element need be made transparent.

Further application of the multi-melting point aspects consists in the insertion of several wax beads of the type shown in FIG. 1 into a plurality of openings or cavities provided within the confectionary head, whereby each temperature sending element has a different melting point and each is preferably mixed with a dye having a different and distinctive color thereby providing a lollipop having a universal range for fever indication, further refining the degree of fever.

We have determined that by shaping the confectionary head so as to have a plano-convex shape (note surfaces 12a and 12b of FIG. 1b) the wax indicator is magnified somewhat so as to enable a smaller wax bead to be employed without any reduction in the ability to discern temperature changes. If desired, the confectionary head may be shaped to assume any form appealing to a child's aesthetics such as, for example, a clown face, animal shapes, space age shapes, vehicles, trains, balloons, toys and the like. Likewise the wax bead may assume a variety of shapes which lend themselves to simplification of the observation of a change in shape.

A variation of the lollipop is shown in FIG. 1e wherein the confectionary head is molded so as to have the appearance of a clock face. Imbedded in the head 12 are a plurality of temperature sensitive indicating devices each containing a different colored wax indicator, which indicators are imbedded beneath an associated one of the numbers of the dial of the clock face. The child himself could easily read the face after sucking on the lollipop for 2-3 minutes.

Another preferred embodiment 20 of the present invention is shown in FIG. 2 which comprises an elongated slender hollow cylindrical member or straw 21 formed of a suitable confectionary material and having wax beads, which may be of the type shown in FIGS. 1a-1d and which are imbedded at different locations 22-25 of the straw. The ends 21a and 22a of the straw are preferably provided with rounded beaded terminations so as to avoid injury to the child's mouth. The imbedded beads are arranged in closely spaced fashion adjacent one end 22a of the straw. The walls of the confectionary straw may be enlarged in the region of the wax beads to facilitate their positioning and securement.

FIG. 3 shows still another embodiment 30 of the present invention which may be employed for use with infants so as to avoid the danger and discomfort of rectal thermomers. The embodiment 30 assumes the shape of a pacifier having a confectionary head 31 formed in the shape of a candy nipple and integrally molded to a disc shaped (preferably plastic) member 32 having a U-shaped handle 33 integrally joined threto. The candy nipple 31 may be provided with a plurality of hydrocarbon wax beads 34–37 each being adapted to indicate a different temperature level. Due to the fact that the beads are non-toxic, any of the embodiments described herein may be completely ingested without in any way harming the patient.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. A temperature sensitive device especially adaptable for use in taking a child's temperature comprising:
a confectionary member;
means at one end of the confectionary member for holding and retrieving the confectionary member;
said member having a hollow interior portion and having transparent portions for viewing said hollow interior portion from either side of said confectionary member;
a temperature sensitive element of a predetermined shape positioned within said hollow interior portion and which is clearly observable through said transparent portions due to its contrasting color and shape relative to the transparent portions of the confectionary member through which it is viewed, said element being adapted to change state when elevated to a predetermined temperature level so as to substantially effectively disappear thereby serving as a positive indication of the predetermined temperature level.

2. The device of claim 1 wherein said holding and retrieving means comprises an elongated stem having a first end imbedded into said confectionary member and adapted to be held by the user near its opposite end.

3. The device of claim 2 wherein said member has at least one convex surface adapted to conform generally to the palate of the oral cavity.

4. The device of claim 1 wherein said temperature sensitive element is a bead of hydrocarbon wax.

5. The device of claim 4 wherein said bead has a substantially conical configuration.

6. The device of claim 4 wherein said bead is admixed with a non-toxic dye of a predetermined color to enhance the contrast between said bead and said confectionary member.

7. The device of claim 1 wherein said temperature sensitive element is a straight chain aliphatic hydrocarbon wax formed in a small bead.

8. The device of claim 1 wherein said temperature sensitive element is a hydrocarbon wax of the alkane type having 19–22 carbon atoms.

9. The device of claim 1 wherein said temperature sensitive element is a hydrocarbon wax of the alkane type having 19–22 carbon atoms, such as those waxes taken from the group con-sisting of Nonadecane $CH_3 (CH_2)_{17} CH_3$; Eicosane $CH_3 (CH_2)_{18} CH_3$; Heneicosane $CH_3 (CH_2)_{19} CH_3$; and Docosane $CH_3 (CH_2)_{20} CH_3$.

10. The device of claim 1 wherein said confectionary member is made of barley sugar.

11. The device of claim 1 wherein said confectionary member is molded in the form of a hollow elongated tubular member.

12. The device of claim 1 wherein said confectionary member and said holding and retrieving means collectively form a pacifier.

13. A temperature sensitive device comprising:
a confectionary member, at least a portion of said member being transparent;
means at one end of the confectionary member for holding and retrieving the confectionary member;
said confectionary member having a plurality of hollow interior portions arranged in a predetermined order and each being adjacent said transparent portion so as to be viewable from either side of said member;
a plurality of temperature sensitive elements of predetermined shape each positioned within an associated one of said hollow portions and each being adapted to melt when elevated to different predetermined temperature levels, whereby the location of each of said elements in their associated interior portions substantially effectively disappears when achieving their predetermined temperature level to positively identify their designated temperature values.

14. The device of claim 13 wherein said temperature sensitive element is a bead of hydrocarbon wax.

15. The device of claim 14 wherein each of said beads is admixed with a non-toxic dye of a predetermined color to enhance the contrast between said bead and said confectionary member.

16. The device of claim 13 wherein said holding and retrieving means comprises an elongated stem having a first end imbedded into said confectionary member and adapted to be held by the user near its opposite end.

17. A temperature indicator comprising:
a generally disc-shaped body of transparent confectionary material;
an elongated stem having a first end imbedded in said body and adapted to be held by a user near its opposite end;
a bead of hydrocarbon wax adapted to melt at a predetermined temperature being imbedded in said body and viewable from either side of said body;
said bead being admixed with a non-toxic dye to provide said bead with a color which sharply contracts with the transparent body;
said bead being adapted to change its shape upon melting to provide a visual indication of body temperature.

* * * * *